United States Patent
Knoll et al.

(10) Patent No.: US 12,137,674 B2
(45) Date of Patent: Nov. 12, 2024

(54) UNDERWATER FEED MOVEMENT DETECTION

(71) Applicant: TidalX AI Inc., San Ramon, CA (US)

(72) Inventors: Matthew Aaron Knoll, Mountain View, CA (US); Harrison Pham, Sunnyvale, CA (US); Ryan Heacock, Cupertino, CA (US); Matthew Stokes, Centennial, CO (US)

(73) Assignee: TidalX AI Inc., San Ramon, CA (US)

( * ) Notice: Subject to any disclaimer, the term of this patent is extended or adjusted under 35 U.S.C. 154(b) by 217 days.

(21) Appl. No.: 17/541,061

(22) Filed: Dec. 2, 2021

(65) Prior Publication Data

US 2023/0172169 A1    Jun. 8, 2023

(51) Int. Cl.
*G06T 7/20* (2017.01)
*A01K 61/85* (2017.01)
(Continued)

(52) U.S. Cl.
CPC .............. *A01K 61/85* (2017.01); *G06T 7/20* (2013.01); *G06T 7/70* (2017.01); *G06T 11/001* (2013.01);
(Continued)

(58) Field of Classification Search
CPC ........ A01K 61/85; A01K 61/80; A01K 79/00; G06T 7/20; G06T 7/70; G06T 11/001;
(Continued)

(56) References Cited

U.S. PATENT DOCUMENTS

| 10,856,520 B1 | 12/2020 | Kozachenok et al. |
| 11,464,213 B2 | 10/2022 | Rishi et al. |

(Continued)

FOREIGN PATENT DOCUMENTS

| CN | 108040948 | 5/2018 |
| EP | 2244934 | 11/2010 |

(Continued)

OTHER PUBLICATIONS

Lantsova, Ekaterina, Tatiana Voitiuk, Tatiana Zudilova, and Arto Kaarna. "Using low-quality video sequences for fish detection and tracking." In 2016 SAI Computing Conference (SAI), pp. 426-433. IEEE, 2016. (Year: 2016).*

(Continued)

*Primary Examiner* — Carol Wang
(74) *Attorney, Agent, or Firm* — Fish & Richardson P.C.

(57) ABSTRACT

Methods, systems, and apparatus, including computer programs encoded on computer-storage media, for underwater feed movement detection. In one aspect, the method may include the actions of obtaining images captured at different time points, where the images are captured by a camera and indicate feed that has been dispersed by a feeder for aquatic livestock inside an enclosure; determining, for each image, respective locations of the feed indicated by the image; determining, from the respective locations of the feed, a respective movement of the feed over the different time points; determining, based on the respective feed movement of the feed over the different time points, water current movement within the enclosure for the aquatic livestock; and outputting an indication of the water current movement.

19 Claims, 3 Drawing Sheets

(51) Int. Cl.
  *G06T 7/70*    (2017.01)
  *G06T 11/00*   (2006.01)
  *G06V 10/22*   (2022.01)
  *G06V 20/05*   (2022.01)
  *H04N 13/204*  (2018.01)
  *H04N 23/90*   (2023.01)

(52) U.S. Cl.
  CPC ............ *G06V 10/225* (2022.01); *G06V 20/05* (2022.01); *H04N 13/204* (2018.05); *H04N 23/90* (2023.01); *G06T 2200/24* (2013.01); *G06T 2207/10021* (2013.01)

(58) Field of Classification Search
  CPC ...... G06T 2200/24; G06T 2207/10021; G06V 10/225; G06V 20/05; H04N 13/204; H04N 23/90; Y02A 40/81
  See application file for complete search history.

(56) References Cited

U.S. PATENT DOCUMENTS

| | | |
|---|---|---|
| 2017/0150701 A1 | 6/2017 | Gilmore et al. |
| 2019/0228218 A1 | 7/2019 | Barnaby et al. |
| 2019/0340440 A1 | 11/2019 | Atwater et al. |
| 2020/0107524 A1 | 4/2020 | Messana et al. |
| 2020/0113158 A1 | 4/2020 | Rishi et al. |
| 2020/0155882 A1 | 5/2020 | Tohidi et al. |
| 2020/0288678 A1 | 9/2020 | Howe et al. |
| 2021/0360906 A1* | 11/2021 | Yao .................. A01K 29/005 |
| 2022/0279765 A1* | 9/2022 | Stone ................ G05B 13/0265 |

FOREIGN PATENT DOCUMENTS

| | | |
|---|---|---|
| EP | 2178362 | 11/2016 |
| EP | 3484283 | 5/2019 |
| JP | 2002171853 | 6/2002 |
| JP | 2021136965 A * | 9/2021 |
| NO | 300401 | 5/1997 |
| WO | WO 1990/007874 | 7/1990 |
| WO | WO 1997/019587 | 6/1997 |
| WO | WO 2009/008733 | 1/2009 |
| WO | WO 2009/097057 | 8/2009 |
| WO | WO 2014/179482 | 11/2014 |
| WO | WO 2018/011744 | 1/2018 |
| WO | WO 2019/002881 | 1/2019 |
| WO | WO 2019/121851 | 6/2019 |
| WO | WO 2019/188506 | 10/2019 |
| WO | WO 2019/232247 | 12/2019 |
| WO | WO 2020/046524 | 3/2020 |
| WO | WO 2020/132031 | 6/2020 |
| WO | WO 2021/006744 | 1/2021 |
| WO | WO 2021/030237 | 2/2021 |
| WO | WO 2022/010815 | 1/2022 |
| WO | WO 2020/072438 | 4/2022 |

OTHER PUBLICATIONS

Extended Search Report in European Appln. No. 22151132.2, dated May 2, 2022, 10 pages.
International Preliminary Report on Patentability in International Appln. No. PCT/US2020/059829, dated May 27, 2022, 11 pages.
International Search Report and Written Opinion in International Appln No. PCT/US2022/018651, dated Jun. 22, 2022, 14 pages.
International Search Report and Written Opinion in International Appln No. PCT/US2022/021683, dated Jun. 27, 2022, 14 pages.
International Search Report and Written Opinion in International Appln No. PCT/US2022/022250, dated Jul. 6, 2022, 15 pages.
International Search Report and Written Opinion in International Appln No. PCT/US2022/022492, dated Jun. 28, 2022, 13 pages.
International Search Report and Written Opinion in International Appln No. PCT/US2022/022589, dated Jul. 7, 2022, 12 pages.
International Search Report and Written Opinion in International Appln No. PCT/US2022/022837, dated Aug. 2, 2022, 14 pages.
International Search Report and Written Opinion in International Appln No. PCT/US2022/023831, dated Jul. 8, 2022, 13 pages.
International Search Report and Written Opinion in International Appln. No. PCT/US2020/059829, dated Feb. 25, 2021, 18 pages.
International Search Report and Written Opinion in International Appln. No. PCT/US2022/043346, dated Jan. 11, 2023, 14 pages.
Meidell et al., "FishNet: A Unified Embedding for Salmon Recognition," Thesis for Master's degree in Artificial Intelligence, Norwegian University of Science and Technology, Jun. 2019, 86 pages.
Moskvyak et al., "Robust Re-identification of Manta Rays from Natural Markings by Learning Pose Invariant Embeddings," CoRR, Feb. 2019, arXiv:1902.10847v1, 12 pages.
Qiu et al., "Improving Transfer Learning and Squeeze-and-Excitation Networks for Small-Scale Fine-Grained Fish Image Classification," IEEE Access, Dec. 2018, 6(31):78503-78512.
Stein et al., "Consistent melanophore spot patterns allow long-term individual recognition of Atlantic salmon Salmo Salar," Journal of Fish Biology, Nov. 2017, 91(6):1699-1712.
International Search Report and Written Opinion in International Appln. No. PCT/US2022/043346, dated Jun. 13, 2024, 11 pages.
International Preliminary Report on Patentability in International Appln. No. PCT/US2022/043346, dated Jun. 13, 2024, 9 pages.

* cited by examiner

UNDERWATER FEED MOVEMENT DETECTION

FIELD

This specification relates to the collection and processing of sensor data, and one particular implementation relates to automatically performing actions in an aquaculture environment based on processing data from underwater cameras.

BACKGROUND

Aquaculture involves the farming of aquatic livestock, such as fish, crustaceans, or aquatic plants. In aquaculture, and in contrast to commercial fishing, freshwater and saltwater livestock populations are cultivated in controlled environments. For example, the farming of fish can involve raising fish in tanks, fish ponds, or ocean enclosures.

Humans farming aquatic livestock may make decisions based on observations of the aquatic livestock. For example, a human may observe how feed falls through in water to determine feed rate for the aquatic livestock. However, humans are limited in their ability to make observations. For example, human observers may have limited capability to make accurate observations in inclement weather conditions which result in strong currents, and may have limited time when making observations.

SUMMARY

In general, innovative aspects of the subject matter described in this specification relate to underwater feed movement detection. Underwater feed movement detection may be used to automatically initiate actions for aquatic livestock. For example, detection may indicate that (due to strong currents) the feed dispersed by a feeder are drifting away and, in response, an aquaculture system may automatically stop providing feed to the fish. In another example, detection may indicate that feed are quickly drifting out of view of a camera and, in response, the camera may be automatically moved so that the feed stays longer in the view of the camera and the system may better determine whether the feed is being consumed by the aquatic livestock.

Underwater feed movement detection may be performed using sensor data collected by a sensor subsystem that makes observations of an aquatic livestock enclosure at different time points. Sensor data collected at the different time points may be processed using the techniques described further below to generate an estimation of the movement of water current within the livestock enclosure. As used herein, water current refers to a continuous, directed movement of water which may otherwise be difficult or impossible to measure accurately and efficiently. In various cases, the water current may be generated by a number of forces acting upon the water, including wind, the Coriolis effect, breaking waves, cabbeling, and temperature and salinity differences.

The water current movement may be observed to obtain useful information, from which appropriate actions for aquatic livestock may be initiated accordingly. For example, in the cases of inclement weather conditions, strong water current may carry away a large majority of the feed being provided to the livestock by a feeder. Instead, the livestock are consuming only a relatively small amount of the feed. In this example, the dispersion of feed may be halted, e.g., until the water current movement de-escalates. In another example, the water current movement may indicate that the feed is being carried by the water current to a certain region within the enclosure that is relatively inaccessible by the livestock and correspondingly, feed may need to be provided from a different dispersion position that is less affected by the water current, so that they can be more easily consumed by the livestock.

A system that processes sensor data may generate more accurate determination of water current movement and may increase efficiency in farming aquatic livestock. For example, the system can automatically control the camera to ensure that it is optimally positioned to capture images that show feeding behavior of fish, so as to assist a caretaker in making better informed livestock feeding decisions. As another example, the system can automatically decrease or stop providing feed to fish when most of the feed are being carried away by the water current, instead of being consumed by the livestock. Accordingly, the system may decrease feed wasted in raising livestock by reducing an amount of unconsumed feed.

One innovative aspect of the subject matter described in this specification is embodied in a method that includes obtaining images captured at different time points, where the images are captured by a camera and indicate feed that has been dispersed by a feeder for aquatic livestock inside an enclosure; determining, for each image, respective locations of the feed indicated by the image; determining, from the respective locations of the feed, a respective movement of the feed over the different time points; determining, based on the respective feed movement of the feed over the different time points, water current movement within the enclosure for the aquatic livestock; and outputting an indication of the water current movement.

Other implementations of this and other aspects include corresponding systems, apparatus, and computer programs, configured to perform the actions of the methods, encoded on computer storage devices. A system of one or more computers can be so configured by virtue of software, firmware, hardware, or a combination of them installed on the system that in operation cause the system to perform the actions. One or more computer programs can be so configured by virtue of having instructions that, when executed by data processing apparatus, cause the apparatus to perform the actions.

The foregoing and other embodiments can each optionally include one or more of the following features, alone or in combination.

For instance, in some aspects, outputting the indication of the water movement may comprise: visually displaying the indication of the water current movement within a graphical user interface.

In some aspects, the graphical user interface may be configured to display a video stream characterizing the enclosure for the aquatic livestock, and wherein visually displaying the indication of the water current movement may comprise: superimposing the indication of the water current movement on the video stream.

In some aspects, visually displaying the indication of the water current movement may comprise displaying visual indications of a speed, a direction, or both of the water current.

In some aspects, determining, for each image, respective locations of the feed indicated by the image may comprise: processing the image using an object detection machine learning model configured to process an image and to generate output data that specifies one or more bounding boxes identifying the respective locations of the feed indicated by the image.

In some aspects, visually displaying the indication of the water current movement may further comprise: superimposing the one or more bounding boxes on the video steam.

In some aspects, the indication of the water current movement may be color coded.

In some aspects, outputting the indication of the water current movement may comprise: outputting a feeder system control signal to the feeder that moves the feeder, adjusts a feed rate, or both based on the water current movement.

In some aspects, outputting the indication of the water current movement may comprise: outputting a camera movement system control signal to the camera that moves the camera based on the water current movement.

In some aspects, the camera may be a stereoscopic camera.

In some aspects, determining the respective movement of feed over the different time points may comprise: using Kalman filtering techniques to track the respective locations of feed over the different time points.

In some aspects, determining, based on the respective feed movement of the feed over the different time points, the water current movement may comprise: determining a difference in pixel locations of the feed indicated by the images; and determining the water current movement based on the difference in pixel locations of the feed indicated by the images.

In some aspects, the method may further comprise applying a compensation that accounts for camera perspective, camera optics, or camera movement to the difference in pixel locations.

In some aspects, obtaining the images captured at different time points may comprise obtaining images that are captured by two or more cameras at different fixed locations inside the enclosure for the aquatic livestock, and wherein determining the respective locations of the feed may comprise processing the images that are captured by the two or more cameras by using two or more respective object detection machine learning model each trained for a different fixed camera location.

In some aspects, the aquatic livestock may comprise one or more of fish or crustaceans.

The details of one or more implementations are set forth in the accompanying drawings and the description, below. Other potential features and advantages of the disclosure will be apparent from the description and drawings, and from the claims.

BRIEF DESCRIPTION OF THE DRAWINGS

Like reference numbers and designations in the various drawings indicate like elements. The components shown here, their connections and relationships, and their functions, are meant to be exemplary only, and are not meant to limit the implementations described and/or claimed in this document.

DETAILED DESCRIPTION

Figure 1:
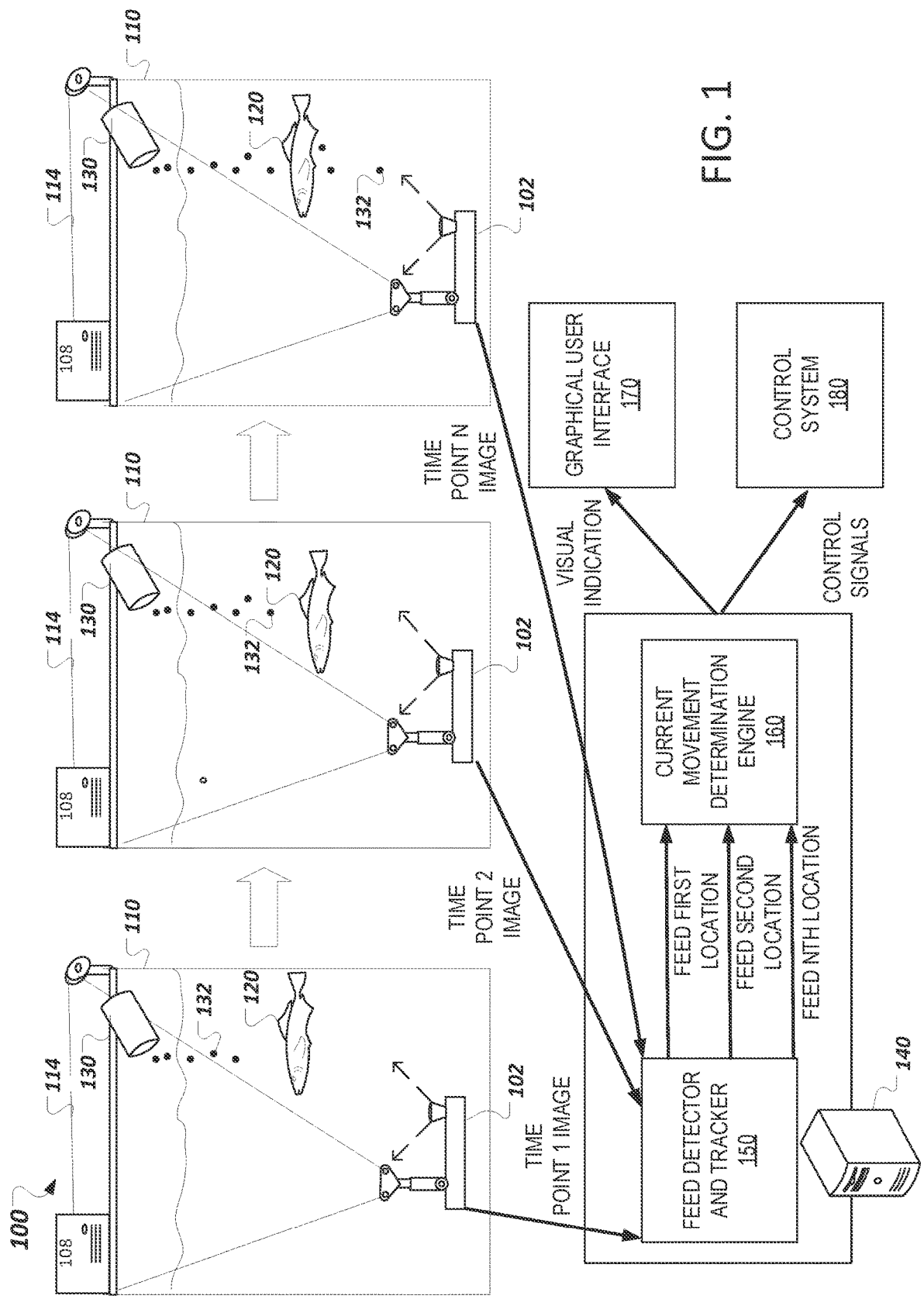
FIG. 1 is a diagram of an example system for underwater feed movement detection.

FIG. 1 is a diagram of an example system 100 for underwater feed movement detection. The system 100 includes a sensor subsystem 102 that collects sensor data at different time points in an enclosure 110, and a control subsystem 140 that both determines water current movement within the enclosure 110 from underwater feed movement detection using the collected sensor data and initiates actions based on the water current movement.

The enclosure 110 may enclose livestock that can be aquatic creatures, such as livestock 120, which swim freely within the confines of the enclosure 110. In some implementations, the aquatic livestock 120 stored within the enclosure 110 can include finfish or other aquatic lifeforms. The livestock 120 can include for example, juvenile fish, koi fish, sharks, salmon, bass, or crustaceans, e.g., shrimp, to name a few examples.

In addition to the aquatic livestock, the enclosure 110 contains water, e.g., seawater, freshwater, or rainwater, although the enclosure can contain any appropriate liquid that is capable of sustaining a habitable environment for the aquatic livestock.

In some implementations, the system 100 may be anchored to a structure such as a pier, dock, or buoy. For example, instead of being confined within the enclosure 110, the livestock 120 can be free to roam a body of water, and the system 100 can monitor livestock within a certain area of the body of water without the enclosure 110.

The system 100 can be used to collect various sensor data at different time points and, in some cases, from different locations in the enclosure 110. For example, the system 100 can be used to monitor the movement of the feed within the enclosure 110. The feed may be negatively buoyant feed that is dispersed by a feeder 130. In this example, the system 100 may collect sensor data that indicates in what directions, and how fast the feed is moving (e.g., drifting) within the enclosure 110, e.g., as the feed is sinking into the bottom of the enclosure 110. As another example, the system 100 can be used to monitor feeding behavior of aquatic livestock. In this example, the system 100 may collect sensor data that indicates where, how much, and for how long fish are feeding within the enclosure 110.

The system 100 may initiate actions based on the collected sensor data. For example, the system 100 may determine (e.g., due to strong currents) that the feed is moving away once it is dispersed by the feeder 130 before eaten by fish and, in response, instruct a feeder to temporarily halt providing feed or use a different feeder to provide feed. As another example, the system 100 may determine that the fish are no longer eating the feed and, in response, instruct a feeder to stop providing feed. As another example, the system 100 may determine that the fish are eating the feed but also a large portion of the feed is uneaten by the fish and, in response, instruct a blower or auger to reduce a rate that feed is being provided to the fish. As yet another example, the system 100 may determine that the fish are quickly eating all the feed and, in response, instruct an auger or blower to increase a rate that feed is being provided to the fish.

In some implementations, the sensor subsystem 102 may be stationary, i.e., may be installed at a fixed location inside the enclosure 110 for the aquatic livestock. For example, the sensor subsystem 102 can include one or more sensors at different fixed locations (e.g., along the bottom of the enclosure), and oriented to capture sensor data of the enclosure 110 at different fixed angles (e.g., at a substantially vertical, upward-facing angle).

In other implementations, the sensor subsystem 102 may be movable. In some of these implementations, the sensor subsystem 102 can be equipped with one or more propellers that allows underwater navigation. In others of these implementations, the system 100 can include a winch subsystem 108 that moves the sensor subsystem 102. The winch subsystem 108 may move the sensor subsystem 102 in a patrol pattern up and down to different depths in the enclosure 110. The winch subsystem 108 can include one or more motors, one or more power supplies, and one or more pulleys to which the cord 114, which suspends the sensor subsystem 102, is attached. A pulley is a machine used to support movement and direction of a cord, such as cord 114. Although the winch subsystem 108 includes a single cord 114, any configuration of one or more cords and one or more pulleys that allows the sensor subsystem 102 to move and rotate, as described herein, can be used.

The sensor subsystem 102 can include one or more sensors that can monitor the livestock. The sensor subsystem 102 may be waterproof and can withstand the effects of external forces, such as typical ocean currents, without breaking. The sensor subsystem 102 can include one or more sensors that acquire sensor data, e.g., images and video footage, thermal imaging, heat signatures, according to the types of sensor of the sensor subsystem. For example, the sensor subsystem 102 can include one or more of the following sensors: a camera, including a stereoscopic camera, an IR sensor, a UV sensor, a heat sensor, a pressure sensor, a hydrophone, a water current sensor, or a water quality sensor such as one that detects oxygen saturation or an amount of a dissolved solid.

The system 100 can additionally store the sensor data captured by the sensor subsystem 102 in a local sensor data storage or at a remote server. In some implementations, the system 100 can store media, such as video and images, as well as sensor data, such as ultrasound data, thermal data, and pressure data, to name a few examples. Additionally, the sensor data can include or be associated with metadata such as GPS information corresponding to a geolocation at which the sensor subsystem captured the sensor data, accelerometer or gyroscope information corresponding to a motion (e.g., acceleration) at which the sensor subsystem captured the sensor data, time stamp information corresponding to a time point at which the sensor subsystem captured the sensor data, or a combination thereof and possible more.

In the example of FIG. 1, the sensor subsystem 102 includes an upward facing camera which is fully submerged in the enclosure 110, although in other embodiments, the sensor subsystem can acquire sensor data without completely submerging the sensor subsystem 102, e.g., while the camera is suspended above the water and facing downwards towards the water.

The control subsystem 140 generates estimation of water current movement within the enclosure 110 from the collected sensor data and initiates actions based on the estimation. The control subsystem 140 may be implemented on one or more computers at one or more locations. The control subsystem 140 may include a feed detector and tracker 150 that process sensor data to detect (i.e., identify the location of) and track the feed indicated by the sensor data, and a current movement determination engine 160 that determines the water current movement within the enclosure 110 based on outputs of the feed detector and tracker 150.

The control subsystem 140 may repeatedly (i.e., at each of different time points) receive sensor data that is collected at different time points, different depths, different angles, or a combination thereof. For example, after being dispersed by the feeder 130, the feed may descend from the top to the bottom of the enclosure 110, while some of the feed may be eaten by the fish, drifted away due to water current, or both. In this example, at a first time point, the control subsystem 140 may obtain an image captured by the sensor subsystem 102 while the feed, e.g., feed 132, is at ten meters deep. At a second time five seconds after the first time point, the control subsystem 140 may obtain an image captured by the sensor subsystem 102 while the feed 132 is at eleven meters deep. And at a third time five seconds after the second time point, the control subsystem 140 may obtain an image captured by the sensor subsystem 102 while the feed 132 is at twelve meters deep. That is, over the first, second, and third time points, the feed 132 descends from ten meters deep to twelve meters deep, and is optionally accompanied with other movements (e.g., random movement, horizontal movement, ascending movement, etc.).

The feed detector and tracker 150 implements components (e.g., in the form of software modules) that perform a perception task, e.g., that identify objects within enclosure 110 or classify already identified objects or both. The components typically include one or more fully-learned machine learning models. A machine learning model may be said to be "fully-learned" if the model has been trained to compute a desired prediction when performing a perception task. In other words, a fully-learned model may generate a perception output based solely on being trained on training data rather than on human-programmed decisions. For example, the perception output may be a classification output that includes a respective object score corresponding to each of one or more object categories, each object score representing a likelihood that the sensor data characterizes an object belonging to the corresponding object category. As another example, the perception output can be an object detection output that includes data defining one or more bounding boxes in the sensor data, and optionally, for each of the one or more bounding boxes, a respective confidence score that represents a likelihood that an object belonging to an object category from a set of one or more object categories is present in the region of the enclosure 110 shown in the bounding box. In this example, instead of or in addition to bounding boxes, the object detection output can include data that defines one or more dots that identify one or more regions of the enclosure 110 in which objects with relatively smaller sizes may be present. Examples of object categories include feed, debris (e.g., marine snow), or different livestock types.

In addition, the components implemented within the feed detector and tracker 150 include one or more components that track the one or more of the identified objects (e.g., one or more instances of the feed) over the different time points. For example, the components can include an object tracker which is configured to run a predetermined set of object tracking algorithms, together with the object detection output, data derived from the object detection output, or both and to output feed movement data that specifies the movement(s) of the tracked feed over the different time points. For example, the object tracker can assign a same label to all bounding boxes defined with reference to the sequence of images that correspond to a same feed. The movement(s) of the feed (e.g., a motion trajectory of each feed) can then be determined from the label data and the object detection output.

The object tracking algorithms may be either deterministic or probabilistic. In the former case, deterministic approaches attempt to minimize a cost of associating each object in a first image or frame to an object in a second image or frame based on a set of motion constraints. The correspondence cost may be formulated as a combinatorial optimization problem that can be solved by determining one-to-one correspondences among all possible associations using optimal assignment methods, such as greedy search methods. In the latter case, probabilistic object tracking methods may model the uncertainties of sensor data (such as sensor noise) to establish correspondence from image to image or frame to frame. Probabilistic object tracking methods typically use the state space approach to model object properties such as position, velocity, and acceleration and take into account measurement uncertainties in the modeling. Probabilistic approaches can include Kalman filtering, extended Kalman filtering, particle filtering, among others.

The control subsystem 140 can provide the feed location data and feed movement data to the current movement determination engine 160. When the current movement determination engine 160 receives the feed location data and feed movement data, the current movement determination engine 160 can use the received data to generate an estimation of the movement of the water current within the enclosure 110, as the feed may be carried by the water current and the movement of the feed may largely result from the movement of the water current, e.g., in addition to gravity. For example, the estimation of water current movement can specify or otherwise define the velocity (i.e., speed and direction) of the water current at a current time point. Additionally or alternatively, the estimation can specify a predicted (or history) trajectory of the water current, e.g., within a certain period of time in the future (or past), e.g., within the next 5 seconds after (or before) the current time point.

The current movement determination engine 160 can generate this estimation based on determining the respective displacements of each tracked feed over the different time points, i.e., based on determining, for each image or video frame from a sequence of images or video frames, how much, and in what direction has the feed traveled since the immediately preceding image or video frame. For example, the current movement determination engine 160 can compute a difference in pixel locations of the feed indicated by the sequence of images, and then determine the water current movement based on the difference in pixel locations of the feed indicated by the images. Appropriate compensations (or adjustments) may sometimes be applied to the difference in pixel locations to account for camera perspective, camera optics, or camera movement, thereby improving the estimation accuracy of the water current movement within the enclosure. For example, with known feed sizes (in terms of pixels) the current movement determination engine 160 is able to compute the distance between the camera and the feed, as well as the degree of compensation that is needed. As another example, the current movement determination engine 160 can determine what compensations may be needed from the known intrinsic and/or extrinsic parameters of the sensor, the metadata associated with the sensor data, or a combination thereof.

The control subsystem 140 may then initiate performance of the action as a result of the determined water current movement. For example, the control subsystem 140 can output an indication of the water current movement to an external system. For example, the control subsystem 140 can output, e.g., over a data communication network, the indication to a graphical user interface 170, which may for example be a user interface of a personal computer, such as desktop or laptop computer, or a cellular, wireless and handheld device, so that graphical user interface 170 can display, among other information, the visual indication of the water current movement to a caretaker of the aquatic livestock. In this example, the visual indication may allow for the caretaker of the aquatic livestock to better observe the livestock and the enclosure 110, so as to make more informed caregiving decisions (e.g., when to start providing feed, stop providing feed, increase a rate that feed is provided, or decrease a rate that feed is provided).

It is worthwhile noting that although the control subsystem 140 described in this document is largely described in the context of detecting underwater movement of feed for aquatic livestock, the control subsystem as well as associated techniques can be similarly applied to any of a variety of other use cases. For example, the enclosure 110 may enclose underwater plants, and the control subsystem 140 can be used for underwater fertilizer movement detection.

Figure 2:
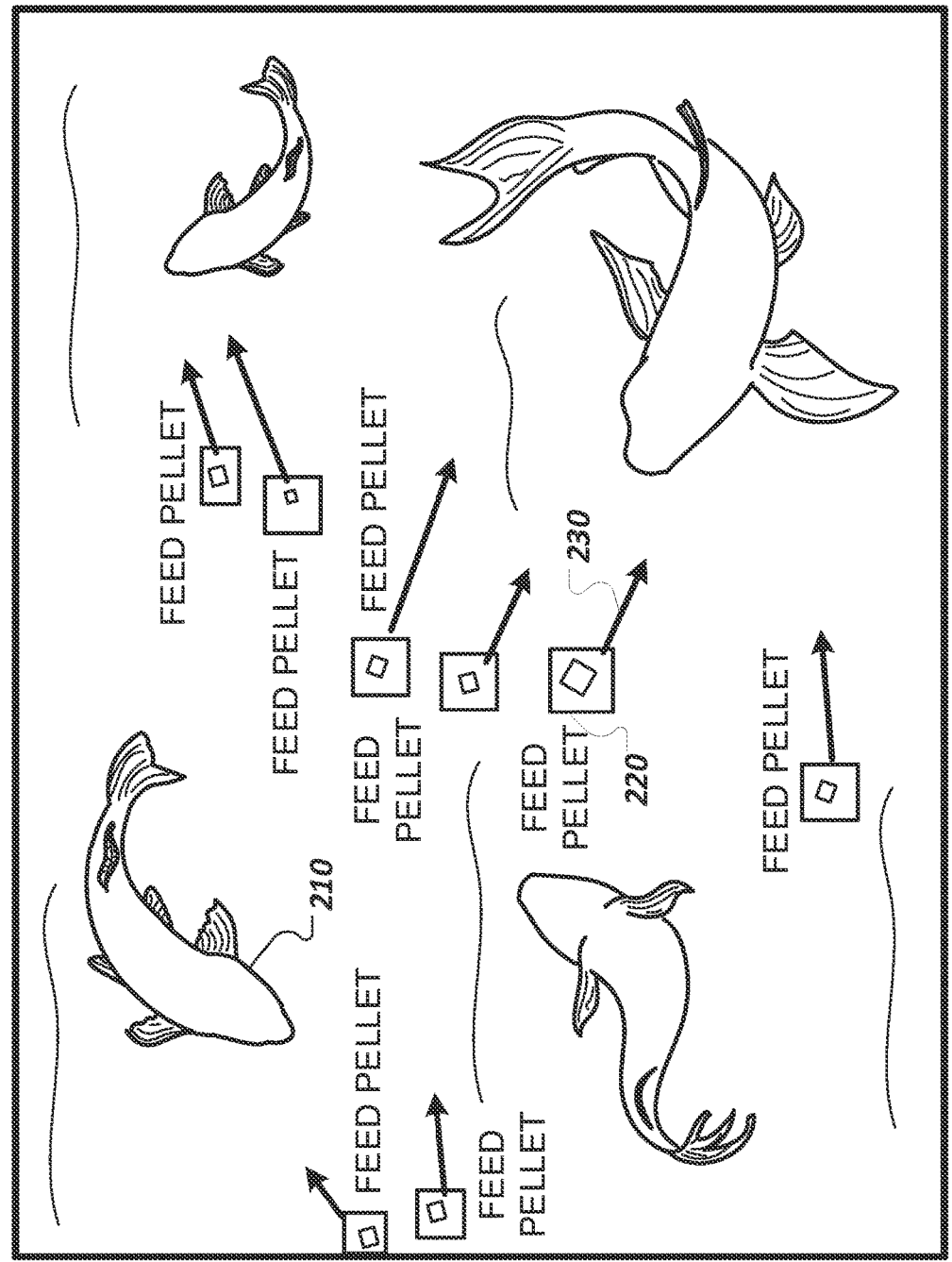
FIG. 2 is an example visualization generated from underwater feed movement detection.

FIG. 2 is an example visualization 200 generated from processing collected sensor data. The visualization 200 may represent a frame of a video stream captured by a camera sensor of the sensor subsystem 102 within the enclosure 110 for the aquatic livestock. The visualization 200 shows the livestock, e.g., a fish 210, inside the enclosure. The visualization 200 shows the feed which may be dispersed from the top of the enclosure. The visualization 200 includes the one or more bounding boxes, e.g., bounding box 220, which identify the respective locations of the detected feed being superimposed on the video steam. Bounding boxes may be rectangular boxes that each enclose a pellet of feed as shown in the frame, where each box is centered around a center of the pellet of feed the box encloses.

The visualization 200 also shows the water current movement determined by the control subsystem 140 by superimposing the indication of the water current movement on the video stream. In the example of FIG. 2, the visualization 200 uses arrows, e.g., arrow 230, with each arrow pointed in the direction of a corresponding feed that's being carried by the water current, and with the length of each arrow being proportional to the speed of the corresponding feed. Instead of or in addition to using arrows, the visualization 200 can be color coded, i.e., can use different color coding to represent different water current speed, direction, or both.

As another example, the control subsystem 140 can output various control signals to a control system 180 that is communicatively coupled to different components of the enclosure 110. In other words, the control subsystem 140 may use the determined water current movement to water current movement to, one or more of, automatically control feeding through the feeder 130, modify the observation of the livestock 120, or modify the observation of the feed.

For example, the control subsystem 140 can output a camera movement system control signal to the sensor subsystem 102 that moves the sensor subsystem based on the water current movement in order to better observe the feed inside the enclosure once dispersed by the feeder. As a particular example, the control subsystem 140 may output an instruction corresponding to an x, y, and z-coordinate within the enclosure 110. For example, the x, y, and z-coordinate can specify a position that is determined by the control subsystem 140 according to the water current movement from which the sensor subsystem 102 may have an unoccluded view of the majority of the feed as they fall through the water. The instruction can also correspond to a rotation, e.g., about an axis of rotation, of the sensor subsystem 102, which changes a horizontal angle of the sensor subsystem 102, the horizontal angle being an angle within the xz-plane at which the sensor subsystem receives sensor input. The instruction can also correspond to a rotation about a pin that connects the sensor subsystem 102 to components of the winch subsystem 108. Such a rotation changes a vertical angle of the sensor subsystem, the vertical angle being measured with respect to the positive y-axis.

The instruction can describe a possible position, horizontal angle, and vertical angle of the sensor subsystem 102 within the enclosure 110. The winch subsystem 108 receives the instructions and activates one or more motors to move the sensor subsystem 102 to the position corresponding to the instructions. For example, the winch subsystem 108 may activate one or more motors to move the cord 114. The cord 114, and the attached sensor subsystem 102, can be moved along the x, y, and z-directions, to a position corresponding to the instruction. A motor of the winch subsystem 108 can be used to rotate the sensor subsystem 102 to adjust the horizontal angle and the vertical angle of the sensor subsystem. A power supply can power the individual components of the winch subsystem. The power supply can provide AC and DC power to each of the components at varying voltage and current levels. In some implementations, the winch subsystem can include multiple winches or multiple motors to allow motion in the x, y, and z-directions.

As another example, the control subsystem 140 can output a feeder system control signal to the feeder 130 that moves the feeder, adjusts a feed rate, or both based on the water current movement. As a particular example, the control subsystem 140 may output an indication of "decrease feeding rate" and, in response, transmit an instruction to a control system of the feeder 130 that causes the feeder to reduce a rate that feed is provided to the fish. For example, this indication may be generated by the control subsystem 140 in the case where the speed of the determined water current movement is above a threshold value. The feeder 130 may include a blower or auger that physically dispenses feed in the form of pellets into the enclosure 110. For example, receipt of an instruction to increase feeding rate may cause the feeder to increase a speed of a fan that blows the feed into the enclosure 110. In another example, receipt of an instruction to decrease feeding rate may cause the feeder to decrease a speed that an augur spins feed into the enclosure 110.

Figure 3:
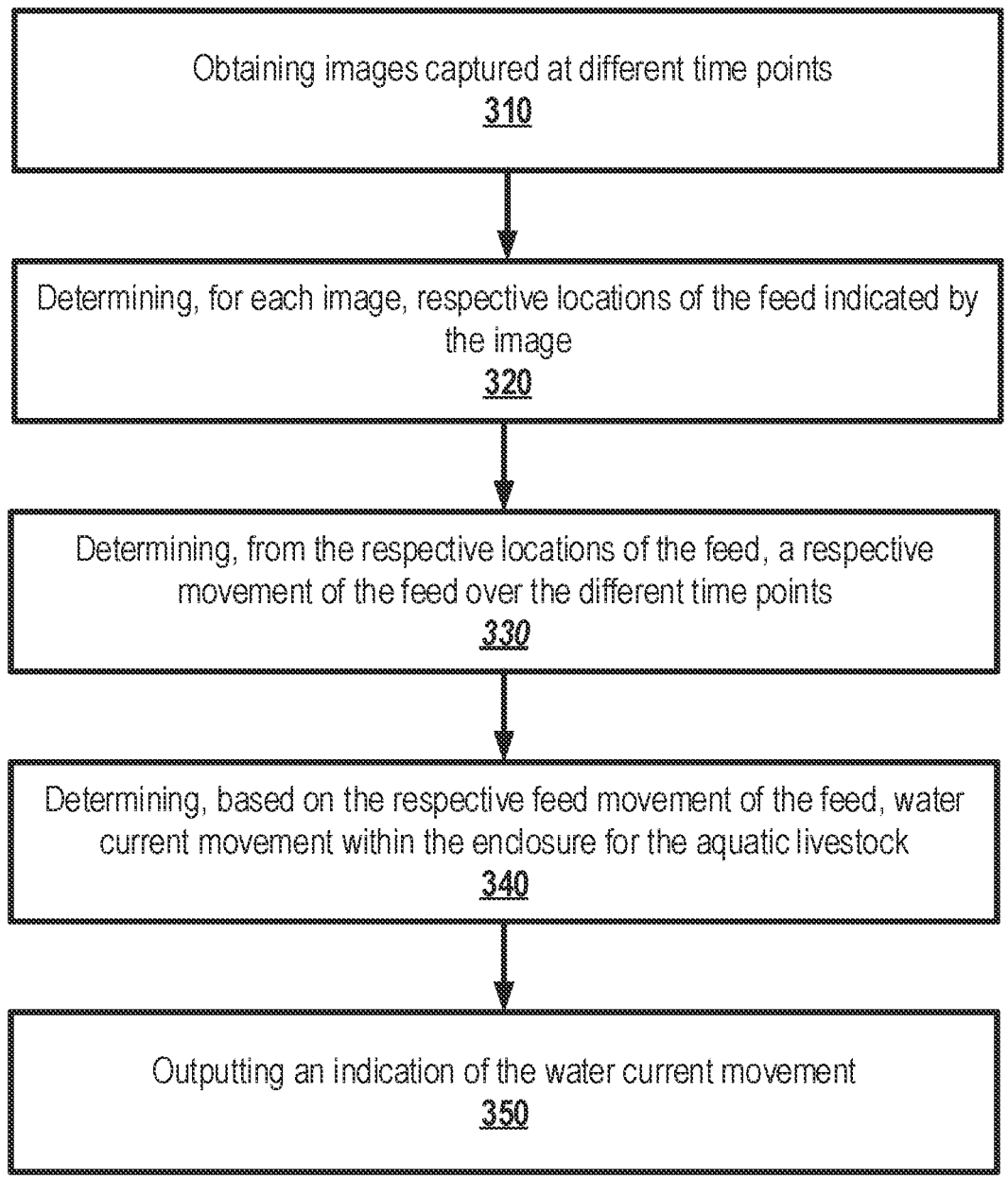
FIG. 3 is flow diagram for an example process for underwater feed movement detection.

FIG. 3 is a flow diagram for an example process 300 for processing sensor data. The example process 300 may be performed by various systems, including, for example, the control subsystem 140 of FIG. 1.

Briefly, and as will be described in more detail below, the process 300 includes obtaining images captured at different time points, where the images are captured by a camera and indicate feed that has been dispersed by a feeder for aquatic livestock inside an enclosure (310), determining, for each image, respective locations of the feed indicated by the image (320), determining, from the respective locations of the feed, a respective movement of the feed over the different time points (330), determining, based on the respective feed movement of the feed over the different time points, water current movement within the enclosure for the aquatic livestock (340), and outputting an indication of the water current movement (350).

The process 300 includes obtaining images captured at different time points, where the images are captured by a camera and indicate feed that has been dispersed by a feeder for aquatic livestock inside an enclosure (310). For example, the control subsystem 140 may repeatedly (i.e., at each of different time points) receive sensor data including image data collected by the sensor subsystem 102.

In some implementations, the sensor subsystem 102 may be stationary, i.e., may be installed at a fixed location inside the enclosure 110 for the aquatic livestock. For example, the sensor subsystem 102 can include one or more cameras at different fixed locations, and oriented to capture images of the enclosure 110 at different fixed angles. For example, the sensor subsystem 102 may capture a sequence of images, e.g., a video, by using one or more stationary cameras installed along the bottom of the enclosure with at a substantially vertical, upward-facing angle.

In other implementations, the sensor subsystem 102 may be movable, e.g., by using a winch subsystem 108 to which the sensor subsystem 102 is attached. In these implementations, the images may be captured by a camera at the different depths, different orientations, or both inside the enclosure 110. For example, the sensor subsystem 102 may capture a sequence of images, e.g., a video, while the sensor subsystem 102 ascends, descends, or circulates around within the enclosure 110.

The process 300 includes determining, for each image, respective locations of the feed indicated by the image (320). The control subsystem 140 can provide the obtained images to the feed detector and tracker 150, which runs components to detect and track the feed indicated by the images. For example, the components of the feed detector and tracker 150 can include an object detection machine learning model that is configured to process an image and to generate output data that specifies one or more bounding boxes identifying the respective locations of the feed indicated by the image. In the cases where the sensor subsystem 102 includes two or more stationary cameras at different fixed locations and/or with different orientations, the feed detector and tracker 150 can implement multiple object detection machine learning models each configured, e.g., through training, for processing images captured from a different stationary camera location and/or a different orientation.

The process 300 includes determining, from the respective locations of the feed, a respective movement of the feed over the different time points (330). For example, the control subsystem 140 can provide the object detection output, data derived from the object detection output, or both to an object tracker component of the feed detector and tracker 150. The object tracker then runs a predetermined set of object tracking algorithms to output feed movement data that specifies the movement(s) of the tracked feed over the different time points.

The process 300 includes determining, based on the respective feed movement of the feed over the different time points, water current movement within the enclosure for the aquatic livestock (340). For example, the control subsystem 140 can compute a difference in pixel locations of the feed indicated by the sequence of images, and then determine the water current movement based on the difference in pixel locations of the feed indicated by the images, subject to any compensation applied as needed that accounts for camera perspective, camera optics, or camera movement.

The process 300 includes outputting an indication of the water current movement (350). For example, the control subsystem 140 can output the indication to a graphical user interface of a user device and cause the graphical user interface to visually display the indication of the water current movement. As another example, the control subsystem 140 can output a feeder system control signal to the feeder that moves the feeder, adjusts a feed rate, or both based on the water current movement. As yet another example, the control subsystem 140 can output a camera movement system control signal to the camera that moves the camera based on the water current movement.

A number of implementations have been described. Nevertheless, it will be understood that various modifications may be made without departing from the spirit and scope of the disclosure. For example, various forms of the flows shown above may be used, with steps re-ordered, added, or removed.

Embodiments of the invention and all of the functional operations described in this specification can be implemented in digital electronic circuitry, or in computer software, firmware, or hardware, including the structures disclosed in this specification and their structural equivalents, or in combinations of one or more of them. Embodiments of the invention can be implemented as one or more computer program products, e.g., one or more modules of computer program instructions encoded on a computer readable medium for execution by, or to control the operation of, data processing apparatus. The computer readable medium can be a machine-readable storage device, a machine-readable storage substrate, a memory device, a composition of matter affecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a tablet computer, a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the invention can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the invention, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the invention have been described. Other embodiments are within the scope of the following claims. For example, the steps recited in the claims can be performed in a different order and still achieve desirable results.

What is claimed is:

1. A method comprising:
    obtaining images captured at different time points, where the images are captured by a camera and indicate feed that has been dispersed by a feeder for aquatic livestock inside an enclosure;
    determining, for each image, respective locations of the feed indicated by the image;
    determining, from the respective locations of the feed, a respective movement of the feed over the different time points;
    determining, based on the respective movement of the feed over the different time points, water current movement within the enclosure for the aquatic livestock, comprising:
        determining a difference in pixel locations of the feed indicated by the images, and
        determining the water current movement based on the difference in pixel locations of the feed indicated by the images; and
    outputting an indication of the water current movement.

2. The method of claim 1, wherein outputting the indication of the water current movement comprises:
    visually displaying the indication of the water current movement within a graphical user interface.

3. The method of claim 2, wherein the graphical user interface is configured to display a video stream characterizing the enclosure for the aquatic livestock, and wherein visually displaying the indication of the water current movement comprises:
    superimposing the indication of the water current movement on the video stream.

4. The method of claim 2, wherein visually displaying the indication of the water current movement comprises displaying visual indications of a speed, a direction, or both of the water current movement.

5. The method of claim 2, wherein the indication of the water current movement is color coded.

6. The method of claim 1, wherein determining, for each image, the respective locations of the feed indicated by the image comprises:
    processing the image using an object detection machine learning model configured to process an input image and to generate output data that specifies one or more bounding boxes identifying the respective locations of the feed indicated by the input image.

7. The method of claim 6, wherein visually displaying the indication of the water current movement further comprises:
    superimposing the one or more bounding boxes on a video stream.

8. The method of claim 1, wherein outputting the indication of the water current movement comprises:
    outputting a feeder system control signal to the feeder that moves the feeder, adjusts a feed rate, or both based on the water current movement.

9. The method of claim 1, wherein outputting the indication of the water current movement comprises:
    outputting a camera movement system control signal to the camera that moves the camera based on the water current movement.

10. The method of claim 1, wherein the camera is a stereoscopic camera.

11. The method of claim 1, wherein determining the respective movement of the feed over the different time points comprises:
    using Kalman filtering techniques to track the respective locations of the feed over the different time points.

12. The method of claim 1, further comprising applying a compensation that accounts for camera perspective, camera optics, or camera movement to the difference in pixel locations.

13. The method of claim 1, wherein obtaining the images captured at the different time points comprises obtaining images that are captured by two or more cameras at different fixed locations inside the enclosure for the aquatic livestock, and wherein determining the respective locations of the feed comprises processing the images that are captured by the two or more cameras by using two or more respective object detection machine learning model each trained for a different fixed camera location.

14. The method of claim 1, wherein the aquatic livestock comprise one or more of fish or crustaceans.

15. A system comprising:
    one or more computers and one or more storage devices storing instructions that are operable, when executed by the one or more computers, to cause the one or more computers to perform operations comprising:
        obtaining images captured at different time points, where the images are captured by a camera and indicate feed that has been dispersed by a feeder for aquatic livestock inside an enclosure;
        determining, for each image, respective locations of the feed indicated by the image;
        determining, from the respective locations of the feed, a respective movement of the feed over the different time points;
        determining, based on the respective movement of the feed over the different time points, water current movement within the enclosure for the aquatic livestock, comprising:
            determining a difference in pixel locations of the feed indicated bythe images, and
            determining the water current movement based on the difference in pixel locations of the feed indicated by the images; and
        outputting an indication of the water current movement.

16. The system of claim 15, wherein outputting the indication of the water current movement comprises:
    visually displaying the indication of the water current movement within a graphical user interface.

17. The system of claim 15, wherein outputting the indication of the water current movement comprises:
    outputting a feeder system control signal to the feeder that moves the feeder, adjusts a feed rate, or both based on the water current movement.

18. The system of claim 15, wherein outputting the indication of the water current movement comprises:

outputting a camera movement system control signal to the at least one camera that moves the camera based on the water current movement.

19. A computer-readable storage device encoded with a computer program, the program comprising instructions that when executed by one or more computers cause the one or more computers to perform operations comprising:

obtaining images captured at different time points, where the images are captured by a camera and indicate feed that has been dispersed by a feeder for aquatic livestock inside an enclosure;

determining, for each image, respective locations of the feed indicated by the image;

determining, from the respective locations of the feed, a respective movement of the feed over the different time points;

determining, based on the respective movement of the feed over the different time points, water current movement within the enclosure for the aquatic livestock, comprising:

determining a difference in pixel locations of the feed indicated by the images, and determining the water current movement based on the difference in pixel locations of the feed indicated by the images; and outputting an indication of the water current movement.

* * * * *